United States Patent [19]

Jones

[11] Patent Number: 5,752,005
[45] Date of Patent: May 12, 1998

[54] FOREIGN FILE SYSTEM ESTABLISHING METHOD WHICH USES A NATIVE FILE SYSTEM VIRTUAL DEVICE DRIVER

[75] Inventor: Clay LaMoyne Jones, Mesa, Ariz.

[73] Assignee: Microtest, Inc., Phoenix, Ariz.

[21] Appl. No.: 589,628

[22] Filed: Jan. 22, 1996

[51] Int. Cl.[6] .................................................. G06F 9/455
[52] U.S. Cl. ................................................................ 395/500
[58] Field of Search ................................ 395/500, 611, 395/614, 182, 650, 674, 742

[56] References Cited

U.S. PATENT DOCUMENTS

| | | | |
|---|---|---|---|
| 5,410,709 | 4/1995 | Yu | 395/742 |
| 5,414,848 | 5/1995 | Sandage et al. | 395/650 |
| 5,504,892 | 4/1996 | Atsatt et al. | 395/614 |
| 5,548,759 | 8/1996 | Lipe | 395/611 |
| 5,564,011 | 10/1996 | Yammine et al. | 395/182.13 |
| 5,581,768 | 12/1996 | Garney et al. | 395/674 |

*Primary Examiner*—Kevin J. Teska
*Assistant Examiner*—Dan Fiul
*Attorney, Agent, or Firm*—Meschkow & Gresham P.L.C.; Lowell W. Gresham; Jordan M. Meschkow

[57] ABSTRACT

A computer (10) includes an operating system (14) having a system manager (18) and a native file system (20). An installable file system (36) installs hooks at a core interface (24) between the system manager (18) and the native file system (20). Hooks are installed for only a portion of the many native function routines (26) provided by the native file system (20). A virtual driver (30) communicates with the native file system (20) and simulates a file storage device having substantially no files stored thereon. Foreign file system device (42) requests for function routines that have not been hooked are handled by the native file system (20) and virtual device (30). Foreign file system device (42) requests for hooked function routines are handled by a foreign file system (34).

20 Claims, 4 Drawing Sheets

FOREIGN FILE SYSTEM ESTABLISHING METHOD WHICH USES A NATIVE FILE SYSTEM VIRTUAL DEVICE DRIVER

TECHNICAL FIELD OF THE INVENTION

The present invention relates generally to the operation of computers. More specifically, the present invention relates to the establishment of a foreign file system which operates in conjunction with an operating system's native file system.

BACKGROUND OF THE INVENTION

A computer operating system represents a collection of computer programs or routines which control the execution of application programs and that may provide services such as resource allocation, scheduling, input/output control, and data management. A file system is a significant portion of an operating system. The file system is a collection of function routines and file management structures that perform various tasks related to files stored on physical or logical mass storage devices. For example, these function routines are used to open specified files, read specific blocks of data, write specific blocks of data, and close files. The file system communicates with a collection of device drivers, which are themselves routines and which are adapted to communicate with specific hardware devices. Thus, a driver for one type of hard disk drive may differ from a driver for another type of hard disk drive, and both drivers will differ from a driver used to interface the operating system to a specific printer.

As operating systems become more complex, file systems likewise become more complex. A file system for a computer network operating system may have hundreds of function routines. The vast majority of these function routines may provide seldom used, obscure functions not needed for basic file operations. Moreover, complex operating systems are often configured to optimize performance for specific types of devices. Typically, hard disk access performance is optimized because hard disks are capable of high data transfer rates and such access occurs nearly continuously in the operation of many computers and computer networks.

However, the consequences of hard disk drive optimization techniques used with the native file systems included in conventional operating systems are undesirable in certain situations. One of these situations occurs when CD ROM drives and other devices are installed on computer networks. Various conventional products install individual CD ROM drives on a network as individual devices. Each individual CD ROM is assigned a device or volume name, and a caching buffer is allocated in file server RAM to optimize data access for the device. Unfortunately, conventional native file systems size the caching buffer in proportion to the number of files and directories on a specific CD ROM, and CD ROMS often include many files and directories. Each CD ROM on the network has its own file server caching buffer in RAM, and the buffer is often very large. While good data access performance may result, the allocation of a large RAM caching buffer is undesirable because it increases file server costs by requiring massive amounts of RAM and consumes RAM which may be better used for other programs.

Moreover, organizations having computer networks often need scores of CD ROM drives rather than just a few. When many CD ROM drives are mounted as individual volumes, the RAM consumption problem is magnified to intolerable proportions. In addition, conventional native file systems accommodate only a limited number of unique volume names. For example, the well known Novell network operating system accommodates only 64 volume names. Thus, the individual volume mounting technique places what is often an undesirably low limit on the maximum number of CD ROMs which may be mounted on the network.

Other conventional products permit a collection or set of CD ROM drives to be mounted as a single volume. This volume set-mounting technique ameliorates the RAM consumption and volume name restriction problems. However, it still causes the operating system to allocate a massive caching buffer and imposes other serious problems. In order to change any individual CD ROM in a mounted set, the entire set must be dismounted then mounted again, an activity which occurs often with CD ROMS but seldom with hard disk drives. Thus, conventional native file systems may spend an undesirably long time dismounting and mounting volumes each time a CD ROM is changed. In addition, when one network user wants to make a CD ROM change, all network users are forced to endure intolerable dismount and mount durations, often without warning.

Of course, one may simply design a foreign file system which replaces or otherwise augments the native file system for specific devices, such as CD ROMS. Such a foreign file system could optimize overall network performance for the specific devices. However, implementing the hundreds of function routines included in a native file system is an exceptionally complex task. If successful, the resulting foreign file system would be an undesirably large and complex program which would itself consume a large amount of RAM, be difficult to successfully debug, and cost an excessive amount. Such a task is nearly as complex as designing a new operating system.

SUMMARY OF THE INVENTION

Accordingly, it is an advantage of the present invention that an improved foreign file system establishing method and computer program are provided.

Another advantage of the present invention is that an installable file system need handle only basic file system functions.

Another advantage is that an installable file system operates in conjunction with a native file system.

Another advantage is that a native file system manages a virtual device which is configured to consume only a small amount of RAM while a foreign file system manages a real device which corresponds to the virtual device.

The above and other advantages of the present invention are carried out in one form by a method of establishing a foreign file system on a computer configured to run an operating system. The operating system is configured to implement a native file system having a multiplicity of function routines. The method calls for programming the operating system to access a virtual device driver configured in accordance with the native file system. The virtual device driver is arranged to emulate a file storage device having substantially no files stored thereon. Program flow threaded within the operating system to one of the function routines is routed to an installable file system rather than to the native file system.

BRIEF DESCRIPTION OF THE DRAWINGS

A more complete understanding of the present invention may be derived by referring to the detailed description and claims when considered in connection with the figures, wherein like reference numbers refer to similar items throughout the figures, and:

DETAILED DESCRIPTION OF THE PREFERRED EMBODIMENTS

Figure 1:
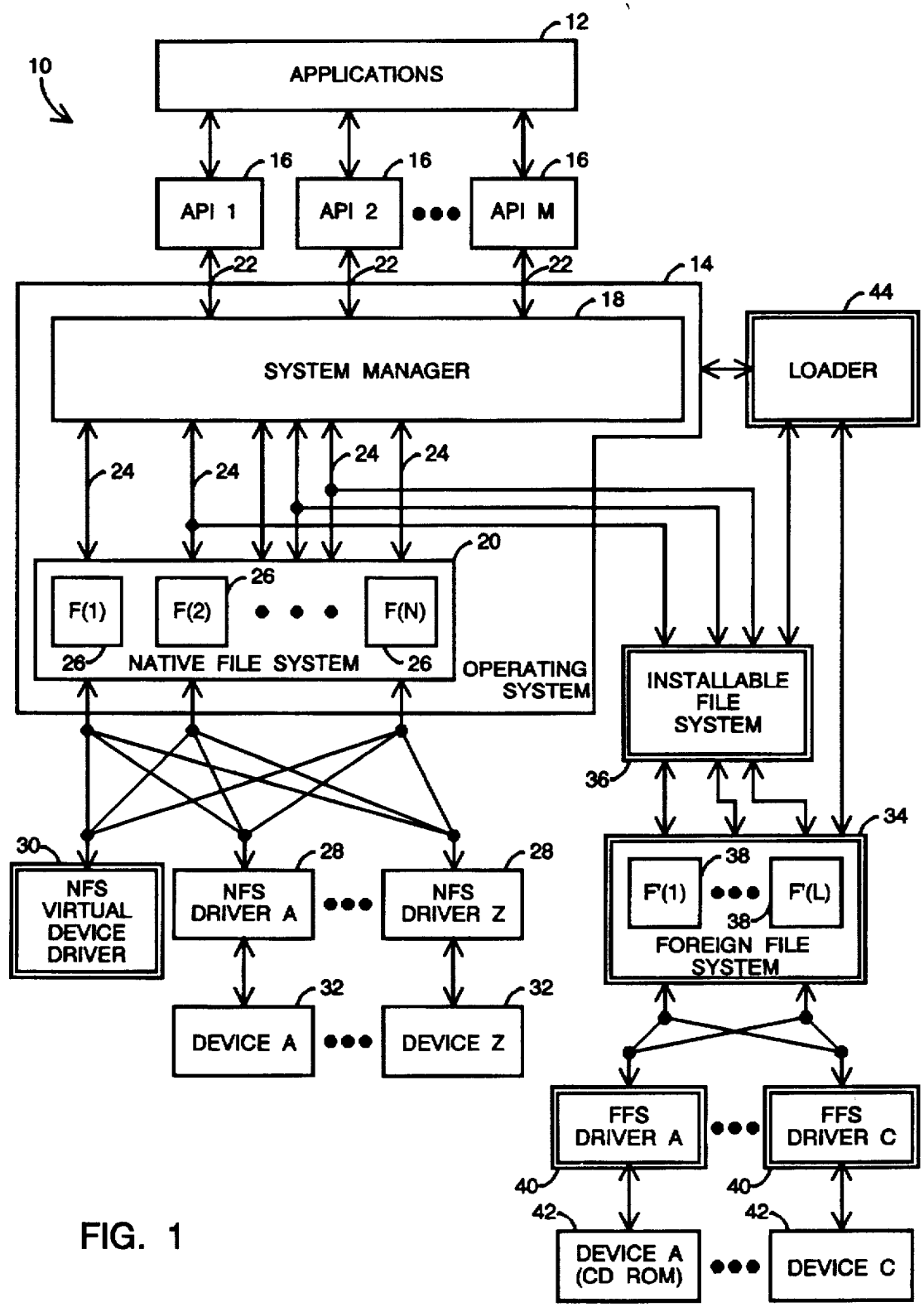
FIG. 1 shows a block diagram of a collection of computer programs installed on a computer in accordance with the present invention.

FIG. 1 shows a block diagram of a collection of computer programs installed on a computer 10. Computer 10 may, but is not required to be configured as a network file server. FIG. 1 illustrates computer programs arranged in a hierarchy with applications 12 at the top of FIG. 1 and various drivers located toward the bottom of FIG. 1. Applications 12 are high level computer programs which accomplish specific tasks. Often, these tasks are the uses which justify the existence of computer 10, and applications 12 are desirably configured to be easily transportable from computer to computer. Drivers represent low level software which most directly communicates with computer hardware, hereinafter referred to as devices. Devices include, but are not limited to hard disk drives, floppy disk drives, CD ROM drives, ZIP drives, magneto-optical drives, erasable CD drives, printers, modems video controllers, tape back-up systems, and the like.

Applications 12 may communicate with an operating system 14 through various application program interfaces (APIs) 16. For purposes of the present invention, operating system 14 is described herein in a manner consistent with various different versions of the Novell network operating system. However, those skilled in the art should appreciate that different operating systems have similar features and functions and that the present invention is not limited to use only in connection with this operating system or only in connection with network operating systems. In particular, FIG. 1 illustrates operating system 14 as having a system manager portion 18 and a native file system portion 20.

Program flow passes through various application interfaces 22 between system manager 18 and higher level programs, such as applications 12 and/or APIs 16. Program flow passes through various core interfaces 24 between system manager 18 and lower level programs, such as native file system 20. In more complex operating systems 14, system manager 18 manages RAM, coordinates multiple access at the same time, and performs numerous other functions. However, in more simple operating systems system manager 18 may be omitted altogether.

Native file system 20 includes a multiplicity of function routines 26. FIG. 1 identifies function routines 26 using the nomenclature of F(1), F(2), . . . , F(N). In more complex operating systems, native file system 20 may include hundreds of function routines 26. Function routines 26 are called by higher level programs, such as system manager 18, APIs 16 and applications 12, in response to requests for specific services to be performed with respect to a specific device. In a very general sense, the requested services relate to transferring data and to managing the transfer of data. Function routines 26 with the help of lower level software and the hardware devices perform the requested services.

In particular, any function routine 26 may communicate with any driver 28 or 30 installed on computer 10 as needed to perform requested services. Any number of drivers 28 communicate with any number of physical devices 32 as needed to perform requested services. However, as discussed in more detail below, a native file system (NFS) virtual device driver 30 need not communicate with a physical device. NFS virtual device driver 30 is a computer program which simulates a file storage device that has substantially no files stored thereon. NFS virtual device driver 30 and other computer programs are illustrated using a double-lined box in FIG. 1 to indicate that they serve a role in establishing a foreign file system 34 on computer 10 in accordance with the principles of the present invention. These foreign file system related programs may be recorded on computer readable media and provided to computer 10 via conventional techniques such as disks, CD ROMS, on-line services, and the like.

An installable file system 36 is accessed from system manager 18 via selected hooks installed at core interface 24. Those skilled in the art will appreciate that a hook is any programming device which alters program flow away from its original intent. Accordingly, for selected program flow threads progressing through core interface 24, program flow is routed to installable file system 36 rather than to native file system 20 as originally intended. As discussed in more detail below, installable file system 36 may return program flow to its original intended thread or may divert program flow into foreign file system 34.

Foreign file system 34 implements its own set of function routines 38. FIG. 1 identifies function routines 38 using the nomenclature of F' (1), . . . , F' (L). Desirably, foreign file system 34 has significantly fewer function routines 38 than native file system 20 has function routines 26 in order to simplify the foreign file system and use as little RAM as possible on computer 10. Any function routine 38 may communicate with any of a number of real drivers 40. Real drivers 40 communicate with physical devices 42.

Native file system 20 may include function routines 26 directed toward file rights, file locking, file transaction tracking, and the like, which are of little importance to devices 42. Desirably, hooks are omitted for such functions, and foreign file system 34 omits function routines which might correspond to such functions. In an embodiment of the present invention which implements installable file system 36 and foreign file system 34 in a manner suitable for a CD ROM drive and other devices 42, general selected areas that are hooked and for which function routines 38 are provided are indicated below in Table 1.

TABLE 1

| INSTALLABLE FILE SYSTEM FUNCTIONS | |
|---|---|
| DirectorySearch | MapDirectoryNumberToPath |
| OpenFile | GetAccessRights |
| CloseFile | GetOriginalNameSpace |
| CreateFile | GetOtherNameSpace |
| ReadFile | GetEntryFromPathNumber |
| WriteFile | GetDirectoryEntry |
| GetFileSize | ModifyDirectoryEntry |
| GetOpenCount | GetFileInfo |
| MapPathToDirectoryNumber | |

The precise processes and program flow used in implementing function routines 38 are unimportant for the purposes of the present invention. Such function routines are well known to those skilled in the art, and such function routines may be implemented any number of different ways. Moreover, the desired implementation will most likely vary from application to application.

Regardless of implementation, the functions performed by function routines 38 may resemble corresponding functions performed by the selected ones of function routines 26. For example, native file system 20 and foreign file system 34 are both likely to include OpenFile, CloseFile, ReadFile, and WriteFile functions. However, such functions may be implemented differently. Native file system 20 may elect to establish large cache buffers in RAM while Foreign File system 34 may elect to establish an entirely different caching technique or no caching at all. Accordingly, devices mounted through foreign file system 34 do not require computer 10 to allocate large buffer regions of precious RAM. Moreover, foreign file system 34 may be configured to permit any number of devices 42 to be accessed, and foreign file system 34 may permit a single one of such devices 42 to be changed without affecting access to other devices 42. Those skilled in the art should appreciate that foreign file system 34 need not support CD ROM drives. Rather, CD ROM drives represent one type of device 42 for which foreign file system 34 may be established to advantage.

Figure 2:
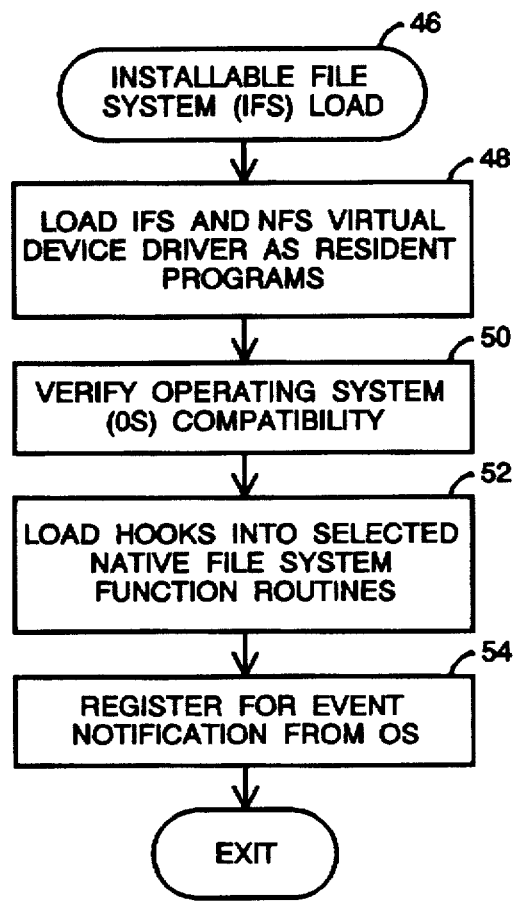
FIG. 2 shows a flow chart of an installable file system load process performed by a loader computer program.

A loader computer program 44 communicates with operating system 14, installable file system 36, and foreign file system 34 to install installable file system 36, NFS virtual device driver 30, and foreign file system 34 on computer 10. FIG. 2 shows a flow chart of an installable file system load process 46 performed by loader 44. Process 46 includes a task 48 which loads installable file system (IFS) 36 and native file system (NFS) virtual device driver 30 (see FIG. 1), desirably as resident programs. Of course, loader 44 (see FIG. 1) is first loaded and executed in order for task 48 to be performed. Those skilled in the art will appreciate that resident programs remain loaded in memory after they execute and are not overwritten by the execution of other programs. Thus, they are available in RAM for instant execution at all times.

After task 48, a task 50 verifies whether operating system 14 (see FIG. 1) is compatible with IFS 36 and virtual driver 30. Task 50 may, for example, verify the name and version number for operating system 14. In addition, task 50 may access program instruction memory locations corresponding to the points in core interface 24 (see FIG. 1) where hooks will be installed to verify that the expected code is present. If operating system compatibility cannot be verified, loading operations may cease (not shown) without process 46 making alterations to operating system 14 or other programs loaded on computer 10 (see FIG. 1).

Next, a task 52 loads hooks into the selected native file system function routines at core interface 24. The hooks will route program flow to IFS 36 for all service requests related to these selected functions. Configurations for different types of hooks are well known to those skilled in the art. In one common example, original program code is replaced with an instruction to jump to an entry point within a target program, such as IFS 36. Within the target program, the original program code is duplicated and followed by an instruction to jump back into the original program thread.

The precise memory addresses at which to locate hooks may be determined in any one of a variety of different ways. For example, published information describing operating system 14 may indicate the location of core interface 24 for various function routines 26 (see FIG. 1). To the extent that published information is lacking, hook locations may be determined empirically. For example, test programs which stimulate various function routines 26 may be compiled using a global library. The program flow may then be traced within operating system 14 to identify threads which pass through the function routines. Desirably, numerous test programs are compiled and traced to verify and narrow the threads. Finally, those skilled in the art can identify entry points to function routines 26 by recognizing sequences of programming instructions which denote subroutine entry. Such sequences typically involve pushing registers on the stack and altering a stack pointer. Of course, these and other techniques which may be known to those skilled in the art are employed during a design process. Task 52 may simply calculate addresses, follow threads short distances, and/or install hooks at specific addresses.

After task 52, a task 54 may register for event notification from operating system 14. Event notification is a conventional service offered by some operating systems. In the preferred embodiment, task 54 registers to receive notification of logging on/off, mounting/dismounting, and loading/unloading module events. Notification of such events will then be sent to IFS 36. IFS 36 need not process the event notices. Rather, IFS 36 may simply pass such notices on to FFS 34 (see FIG. 1). After task 54, program flow exits process 46. However, IFS 36 and virtual device driver 30 desirably remain resident. In addition, loader 44 may, but is not required to remain resident. At this point, IFS 36 has been activated, but it remains in an idle state. IFS 36 has nothing to do until it is linked to foreign file system 34.

Figure 3:
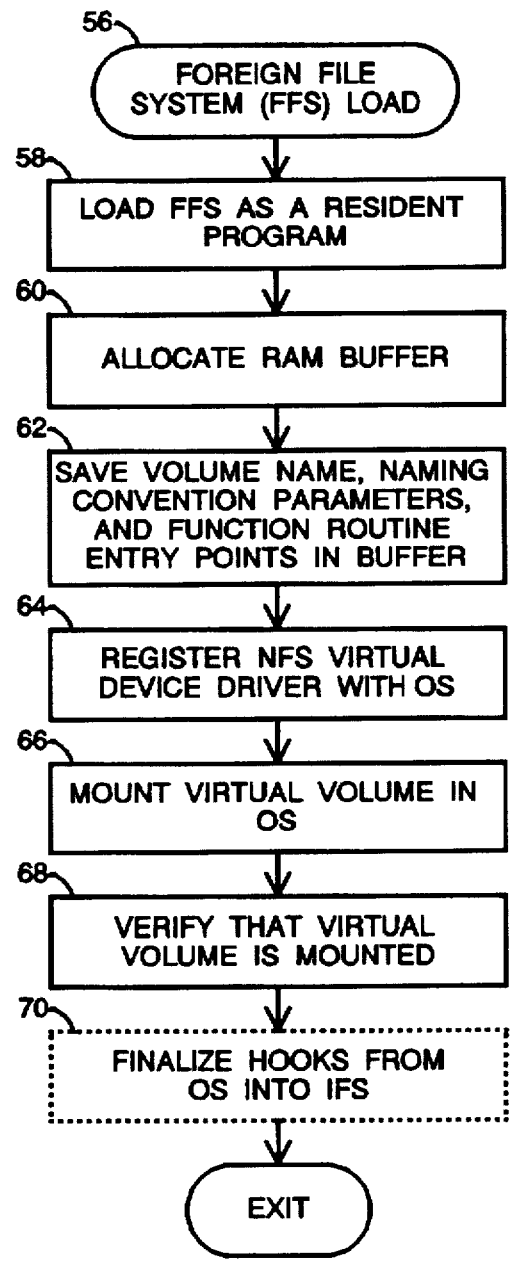
FIG. 3 shows a flow chart of a foreign file system load process performed by the loader program.

FIG. 3 shows a flow chart of a foreign file system load process 56 performed by loader program 44. Process 56 links foreign file system 34 to IFS 36, causing IFS 36, virtual driver 30, and foreign file system 34 to become operational.

Process 56 includes a task 58 which loads FFS 34, desirably as a resident program. In addition, task 58 may load any real drivers 40 with which FFS 34 communicates. However, nothing requires drivers 40 to be loaded at task 58, and drivers 40 may be loaded at any time to accommodate devices 42 whose installation may be desired on computer 10. FFS 34 includes a collection of function routines 38 (see FIG. 1).

Next, a task 60 causes operating system 14 to allocate a small amount of RAM memory for use by IFS 36. This small amount of RAM is used to store data related to the operation of FFS 34 and to logically linking FFS 34 with IFS 36 and virtual driver 30 within computer 10. After task 60, a task 62 obtains and saves a volume name which will be associated with IFS 36 and virtual driver 30 within the domain of operating system 14. While IFS 36 may be configured to accommodate any number of different volumes, only a single volume name is required. Likewise, task 62 obtains and saves data defining file naming conventions supported by FFS 34 and program flow entry points into function routines 38. These data may be saved in the RAM buffer allocated above in task 60.

After task 62, a task 64 registers virtual driver 30 with operating system (OS) 14. Task 64 may pass parameters defining a handle or other identifier to be uniquely associated with virtual driver 30 into operating system 14 along with program flow entry points into virtual driver 30 and other parameters. The handle is associated with the volume name in a one-to-one correspondence within IFS 36. Registration of drivers is a conventional service provided by many operating systems. The other parameters which may be required by the registration process include a drive type. In the preferred embodiment, a read only type is specified to minimize the likelihood of encountering errors related to the operation of virtual driver 30. In addition, other parameters which may be required by the registration process include a drive size. In the preferred embodiment, a minimum size is specified so that native file system 20 will allocate a minimum size cache buffer and for consistency with a file storage device having substantially no files stored thereon.

Next, a task 66 mounts virtual driver 30 with respect to operating system 14. The mounting of drives is a conventional service provided by many operating systems, and virtual driver 30 emulates a drive having substantially no files stored thereon. Task 66 mounts virtual driver 30 by invoking a conventional operating system 14 function which mounts drives and passing the volume name obtained above in task 62 to operating system 14. As a result of tasks 64 and 66, operating system 14 is programmed to access virtual device driver 30 in accordance with native file system 20. While no real physical device is associated with driver 30, to operating system 14 virtual driver 30 acts like a physical file storage device which has substantially no files stored thereon.

After task 66, a task 68 verifies that the virtual volume provided through virtual driver 30 is mounted in operating system 14. Task 68 may access a volume table within operating system 14 in making its determination. After task 68, process 56 may perform an optional task 70. Task 70 finalizes hooks from operating system 14 into IFS 36. Task 70 may take advantage of symbol tables which operating system 14 constructs as a result of mounting the virtual volume provided through virtual driver 30. Such tables may indicate where hooks are to be located. Thus, task 70 completes operations begun above in task 52 of process 46 (see FIG. 2).

After task 70, program flow exits process 56. At this point, foreign file system 34 is operational, and applications 12 (see FIG. 1) may access devices 42. However, process 56 may be repeated at any time to add or change volumes and/or devices supported by foreign file system 34 or to add different or additional foreign file systems.

As discussed above, IFS 36 places hooks in interface 24 (see FIG. 1) for only a portion of the multiplicity of function routines 26 included in native file system 20. The operation of applications 12, APIs 16 and system manager 18 is beyond the control of IFS 36. Consequently, applications 12, APIs 16 or system manager 18 may initiate a request to the native file system services for which hooks are not included in interface 24. Moreover, such requests may specify the name assigned to the virtual volume and IFS 36 above in task 66 (see FIG. 3). This situation is managed by native file system 20 without causing computer 10 to crash.

Figure 4:
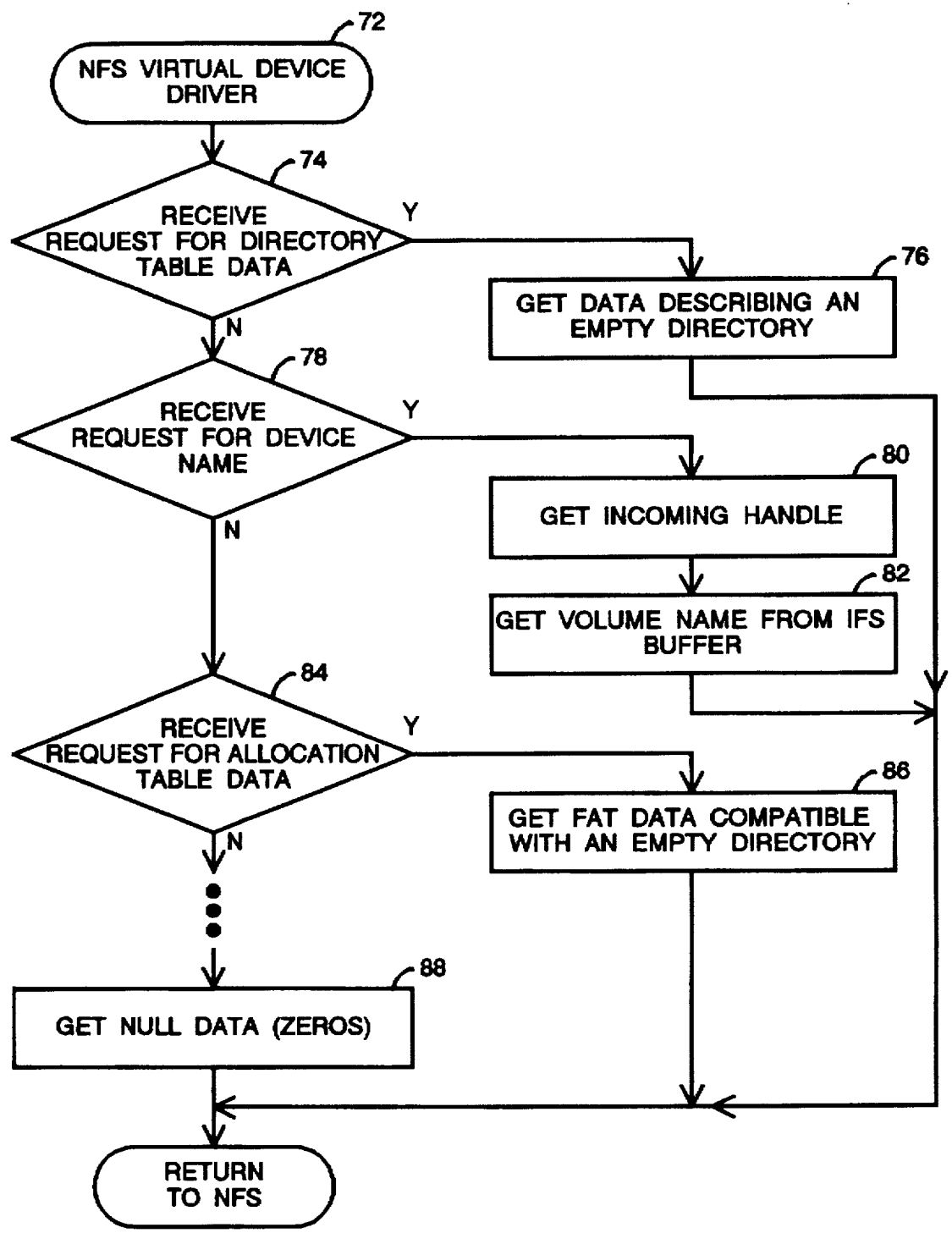
FIG. 4 shows a flow chart of a native file server (NFS) virtual device driver process.

In particular, any request for services through native file system 20 may access virtual driver 30 to provide the requested services. FIG. 4 shows a flow chart of a native file server (NFS) virtual device driver process 72 performed by virtual driver 30 in response to any request. Generally, process 72 emulates a file storage device having substantially no files stored thereon.

Process 72 includes a query task 74 which determines whether directory table data is being requested. In practice, task 74 may determine whether a read of a predetermined block of data from the emulated storage device is being requested. When task 74 determines that directory table data is being requested, a task 76 gets data describing a substantially empty directory. After task 76, program flow returns to native file system 20. As a result of a request for directory data, native file system 20 receives data describing a substantially empty directory.

Those skilled in the art will appreciate that a substantially empty directory table need not be absolutely empty. For example, many file systems require a minimum amount of data. A substantially empty directory may still include data describing a root directory, a volume name, perhaps even a few files and/or the like. Compared to data stored on contemporary CD ROMS and hard disk drives, such minimum amounts of data and files result in a substantially empty directory and to substantially no files.

Referring back to task 74, when a request does not ask for directory data, a query task 78 determines whether a request asks for a device name. In practice, a request for a device name may represent a request to read a predetermined block of data. Those skilled in the art will appreciate that when a disk is formatted, a device name is often written to the disk. It is this name that such requests seek to obtain. Nothing requires formatting of the virtual volume provided by virtual driver 30, and virtual driver 30 has no knowledge of its name. Consequently, when task 78 discovers a request for a device name, a task 80 obtains a handle passed to virtual device 30 in the request. This handle is the same handle used during registration of virtual device 30 above in task 64 (see FIG. 3). Next, a task 82 uses the handle as an index to obtain a volume name from IFS 36. The volume name is obtained from the RAM buffer in which the volume name was stored above in tasks 62 and 64 (see FIG. 3). After obtaining a volume name in task 82, program flow returns to native file system 20. As a result of a request for a volume name, native file system 20 receives the same name that was used in mounting the virtual volume above in task 66 (see FIG. 3).

When a request does not ask for a device name, a query task 84 determines whether a request asks for file allocation table (FAT) data. When FAT data is requested, a task 86 gets FAT data which is compatible with the substantially empty directory data, discussed above in connection with task 76, and program flow returns to native file system 20. Native file system 20 receives data which are usable as FAT data.

As indicated by ellipsis in FIG. 4, process 72 may evaluate whether a request asks for other types of data. Such other types of data may correspond to partition tables, volume tables, hot fix tables, mirror tables, and other memory structures conventionally managed on file storage devices by native file systems. When such requests are detected, process 72 simply returns data which are compatible with a file storage device having substantially no files stored thereon. As indicated at a task 88, when process 72 detects a request for data not specifically recognized as file management data, data amounting to null values are returned. Such null data may, for example, be a block of all zeros. After task 88, program flow returns to native file system 20.

In an alternative embodiment, process 72 may implement a well known RAMDISK program. Such a RAMDISK is desirably configured as a minimum size device to use as little RAM as possible.

Accordingly, virtual driver process 72 simulates a file storage device having substantially no files stored thereon. As a result, native file system 20 creates a minimum size caching buffer which has substantially no effect on overall RAM requirements of computer 10. When function routines 26 of native file system 20 are invoked in a manner which requests services of the volume name associated with virtual device driver 30 and IFS 36, native file system 20 handles such requests with the help of virtual driver 30 in the same manner as such requests are handled for drivers 28 and devices 32 (see FIG. 1). Consequently, foreign file system 34 need not duplicate all function routines 26 from native file system 20 because any non-implemented functions are handled by native file system 20 in a manner which prevents system crashes.

Figures 5, 6:
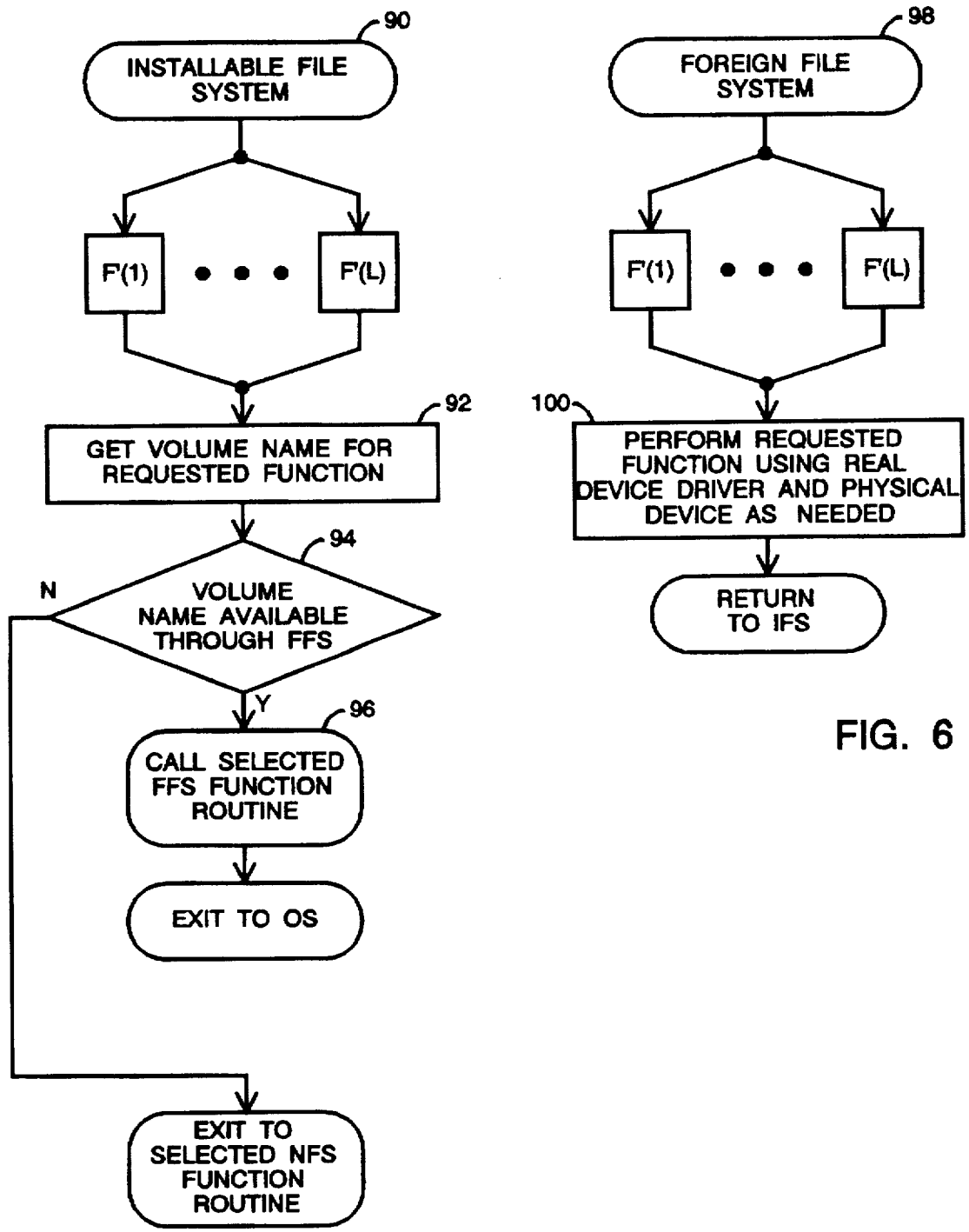
FIG. 5 shows a flow chart of an installable file system process.
FIG. 6 shows a flow chart of a foreign file system process.

As discussed above, hooks for a selected few of function routines 26 divert program flow away from native file system 20 to IFS 36. FIG. 5 shows a flow chart of an installable file system process 90 which is performed when program flow is routed to IFS 36. Program flow is routed to IFS 36 when a request for the services of the selected functions occurs. As illustrated in FIG. 5, IFS 36 may support multiple entry points which correspond to the multiple hooks installed in interface 24 and to the multiple foreign file system functions F' (1) through F' (L).

Process 90 performs similar tasks regardless of which entry point is used by program flow. Namely, a task 92 gets the volume name associated with the requested function. Depending upon the requested function, the volume name may be available in an internal register or pushed on the stack. After task 92, a query task 94 tests whether the request is directed to the virtual volume. In other words, task 94 determines whether a request is being made for a volume name supported by IFS 36 and virtual driver 30. When task 94 determines that the volume name is not supported by IFS 36 and virtual driver 30, program flow is routed to the corresponding function routine 26 in native file system 20. Program flow is routed through the hook installed above in tasks 52 (see FIG. 2) and 70 (see FIG. 3) by which program flow arrived at IFS 36. In this situation, the request does not concern the volume name associated with IFS 36 and will be handled by native file system 20. IFS 36 and foreign file system 34 refrain from first performing the requested function. Desirably, this determination is made quickly so that no perceptible degradation in the performance of operating system 14 occurs.

When task 94 determines that the request is directed or otherwise corresponds to a volume name supported by IFS 36, a task 96 routes program flow to a selected foreign file system (FFS) function routine 38 (see FIG. 1). IFS 36 has previously learned of the appropriate entry point into FFS 34 through task 62 (see FIG. 3). The specific entry point chosen corresponds to the hook which routed program flow into IFS 36.

At this point, the selected FFS routine 38 handles the request with the help of drivers 40 and devices 42. When the FFS routine 38 has completed handling the request, program flow returns to process 90, where it exits to operating system 14. For most situations, program flow is returned to the point in higher level programs which called the function. However, nothing prevents an FFS routine 38 from partially performing a requested function, then allowing program flow to jump to a selected location in a corresponding native file system function routine 26 to complete the function.

FIG. 6 shows a flow chart of a foreign file system process 98 performed by FFS 34. Process 98 is called from task 96 of process 90 (see FIG. 5). As with process 90, process 98 may support multiple entry points which correspond to the multiple hooks installed in interface 24 and to the multiple foreign file system functions F' (1) through F' (L).

Regardless of which entry point is called from IFS 36, process 98 performs a task 100. Task 100 performs the requested function using a real device driver 40 and a physical device 42 (see FIG. 1) as needed to handle the request. As discussed above, the precise processes and program flow used in implementing any single function routine 38 are unimportant for the purposes of the present invention. While similar functions may exist in native file system 20, FFS 34 may implement its functions in a more desirable manner with respect to physical devices 42. For example, FFS 34 is not required to establish massive RAM caching buffers, and FFS 34 may be configured to accommodate any number of device names.

In summary, the present invention provides an improved foreign file system establishing method and related computer program. An installable file system handles only basic file system functions, and the installable file system operates in conjunction with a native file system. The native file system manages a virtual device which is configured to consume only a small amount of RAM while a foreign file system manages a real device which corresponds to the virtual device.

The present invention has been described above with reference to preferred embodiments. However, those skilled in the art will recognize that changes and modifications may be made in these preferred embodiments without departing from the scope of the present invention. For example, an unloader may be included to remove hooks and restore the operating system to its original configuration. Moreover, those skilled in the art will appreciate that the programs, processes, and tasks identified herein may be sequenced, categorized, and organized differently than described herein while achieving equivalent results. These and other changes and modifications which are obvious to those skilled in the art are intended to be included within the scope of the present invention.

What is claimed is:

1. A method of establishing a foreign file system on a computer configured to run an operating system, said operating system being configured to implement a native file system having a multiplicity of function routines, and said method comprising the steps of:

programming said operating system to access a virtual device driver configured in accordance with said native file system;

arranging said virtual device driver to emulate a file storage device having substantially no files stored thereon; and routing program flow threaded within said operating system toward a selected one of said function routines to an installable file system.

2. A method as claimed in claim 1 wherein said programming step comprises the steps of:

registering said virtual device driver with said operating system; and mounting said virtual device driver.

3. A method as claimed in claim 1 wherein said arranging step additionally comprises the step of emulating a read only storage device.

4. A method as claimed in claim 1 wherein said arranging step comprises the step of simulating a substantially empty directory table.

5. A method as claimed in claim 1 wherein:

said multiplicity of function routines is configured to operate in conjunction with a plurality of device drivers including said virtual device driver;

each of said plurality of device drivers has a volume name associated therewith;

said program flow routed to said installable file system occurs in response to a request to perform a function corresponding to said selected one of said function routines for one of said volume names; and said method additionally comprises the step of testing, in said installable file system, whether said request corresponds to said virtual device driver volume name.

6. A method as claimed in claim 5 additionally comprising the step of routing program flow from said installable file system to said selected one of said function routines when said testing step determines that said requests do not correspond to said virtual device driver volume name.

7. A method as claimed in claim 5 additionally comprising the step of routing program flow from said installable file system to a foreign file system when said testing step determines that said request corresponds to said virtual device driver volume name.

8. A method as claimed in claim 7 additionally comprising the step of routing program flow from said foreign file system to a real device driver.

9. A method as claimed in claim 8 wherein said real device driver is configured to communicate with a CD ROM device.

10. A computer program recorded on a computer readable medium for establishing a foreign file system on a computer configured to run an operating system, said operating system being configured to implement a native file system having a multiplicity of function routines, and said computer program comprising:

a virtual device driver configured to communicate with said native file system and to emulate a file storage device having substantially no files stored thereon;

loading means, coupled to said virtual device driver, for programming said operating system to access said virtual device driver; and hooking means, coupled to said loading means, for routing program flow threaded within said operating system toward a selected one of said function routines to an installable file system.

11. A computer program as claimed in claim 10 wherein said loading means includes:

registering program means, coupled to said virtual device driver, for registering said virtual device driver with said operating system; and mounting program means, coupled to said virtual device driver, for mounting said virtual device driver.

12. A computer program as claimed in claim 10 wherein said virtual device driver is configured to emulate a read only storage device.

13. A computer program as claimed in claim 10 wherein said virtual device driver includes means for simulating a substantially empty directory table.

14. A computer program as claimed in claim 10 wherein:

said multiplicity of function routines is configured to operate in conjunction with a plurality of device drivers including said virtual device driver;

each of said plurality of device drivers has a volume name associated therewith;

said hooking means routes program flow to said installable file system in response to a request to perform a function which corresponds to said selected one of said function routines for one of said volume names; and said installable file system includes means, coupled to said hooking means, for testing whether said request corresponds to said virtual device driver volume name.

15. A computer program as claimed in claim 14 additionally comprising routing means coupled to said testing means, said routing means being configured to route program flow from said installable file system to said selected one of said function routines included in said native file system when said testing means determines that said request does not correspond to said virtual device driver volume name.

16. A computer program as claimed in claim 14 additionally comprising routing means coupled to said testing means, said routing means being configured to route program flow from said installable file system to a foreign file system when said testing means determines that said request corresponds to said virtual device driver volume name.

17. A computer program as claimed in claim 16 wherein said foreign file system comprises means for routing program flow from said foreign file system to a real device driver.

18. A computer program as claimed in claim 17 wherein said real device driver is configured to communicate with a CD ROM device.

19. A method of establishing a foreign file system on a computer configured to run an operating system, said operating system being configured to implement a native file system having a multiplicity of function routines which are configured to access a plurality of physical devices wherein each physical device has a volume name associated therewith, and said method comprises the steps of:

simulating a file storage device which is accessible from said native file system, has a substantially empty directory table, and has a volume name associated therewith;

mounting said file storage device with respect to said operating system;

for a portion of said function routines, routing program flow from said operating system to an installable file system, said program flow being initiated in response to requests to perform functions corresponding to said portion of said function routines, and said requests being made with respect to specified ones of said volume names;

testing, in said installable file system, whether said requests correspond to said simulated storage device volume name; and routing program flow from said installable file system to a foreign file system when said testing step determines that said requests correspond to said simulated storage device volume name.

20. A method as claimed in claim 19 additionally comprising the step of routing program flow from said installable file system to said portion of said function routines included in said native file system without first performing said functions when said testing step determines that said requests do not correspond to said simulated storage device volume name.

* * * * *